US010649106B1

(12) United States Patent
Ciarlini et al.

(10) Patent No.: US 10,649,106 B1
(45) Date of Patent: May 12, 2020

(54) CONTINUOUSLY COMBINING SEISMIC MIGRATION RESULTS USING A MASSIVELY PARALLEL PROCESSING (MPP) DATABASE

(71) Applicant: EMC Corporation, Hopkinton, MA (US)

(72) Inventors: Angelo Ciarlini, Rio de Janeiro (BR); Edward Pacheco, Rio de Janeiro (BR); Luiz Guilherme Santos, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 14/857,894

(22) Filed: Sep. 18, 2015

Related U.S. Application Data

(60) Provisional application No. 62/052,813, filed on Sep. 19, 2014.

(51) Int. Cl.
*G01V 1/36* (2006.01)
*G01V 1/22* (2006.01)
*G01V 1/34* (2006.01)

(52) U.S. Cl.
CPC ............... *G01V 1/364* (2013.01); *G01V 1/22* (2013.01); *G01V 1/345* (2013.01); *G01V 2210/67* (2013.01)

(58) Field of Classification Search
None
See application file for complete search history.

(56) References Cited

U.S. PATENT DOCUMENTS

2012/0316792 A1* 12/2012 Liu ..................... G01V 99/00
702/16

* cited by examiner

*Primary Examiner* — Cory W Eskridge
(74) *Attorney, Agent, or Firm* — Daly Crowley Mofford & Durkee, LLP

(57) ABSTRACT

In one aspect, a method includes continuously combining seismic migration results using a massively parallel processing (MPP) database. In another aspect, an apparatus includes electronic hardware circuitry configured to continuously combine seismic migration results using a massively parallel processing (MPP) database. In a further aspect, an article includes a non-transitory computer-readable medium that stores computer-executable instructions. The instructions cause a machine to continuously combine seismic migration results using a massively parallel processing (MPP) database.

20 Claims, 4 Drawing Sheets

CONTINUOUSLY COMBINING SEISMIC MIGRATION RESULTS USING A MASSIVELY PARALLEL PROCESSING (MPP) DATABASE

RELATED APPLICATIONS

This application claims the benefit of U.S. Provisional Application No. 62/052,813 filed Sep. 19, 2014, and entitled "CONTINUOUS MPP-BASED COMBINATION OF SEISMIC MIGRATION RESULTS," which is incorporated herein by reference in its entirety.

BACKGROUND

Seismic migration is the process by which seismic events are geometrically re-located in either space or time to the location the event occurred in the subsurface rather than the location that it was recorded at the surface, thereby creating a more accurate image of the subsurface. This process is necessary to overcome the limitations of geophysical methods imposed by areas of complex geology, such as: faults, salt bodies, folding, and so forth.

Migration moves dipping reflectors to their true subsurface positions and collapses diffractions, resulting in a migrated image that typically has an increased spatial resolution and resolves areas of complex geology much better than non-migrated images. A form of migration is one of the standard data processing techniques for reflection-based geophysical methods (seismic reflection and ground-penetrating radar)

The need for migration has been understood since the beginnings of seismic exploration and the very first seismic reflection data from 1921 were migrated. Computational migration algorithms have been around for many years but they have only entered wide usage in the past 20 years because they are extremely resource-intensive. Migration can lead to a dramatic uplift in image quality so algorithms are the subject of intense research, both within the geophysical industry as well as academic circles.

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Described herein are techniques to speed up an RTM (reverse time migration) processing by transferring the results from the migration of different seismic shots to a massively parallel processing (MPP) database. For example, the MPP database continuously ingests the data into various segments in parallel. When the volume of transferred data reaches a certain limit, a parallel sum is executed combining (stacking) the results transferred so far. At the end of the process, results from processing all shots are stacked within the MPP database. As data ingestion and sum can occur in parallel with the seismic migration, the high performance computing (HPC) compute nodes can process the seismic shots without any interruption.

The techniques described herein also provide a fast recovery procedure for any failure of HPC nodes, without resorting to any additional checkpointing procedure. For example, only the shots from the failed node that have not yet been transferred needs to be processed again. In this way, a minimal amount of work has to be repeated.

The techniques described herein are suitable in particular when the processing of each shot can be entirely executed within a single compute node. In this case, by scaling the size of the MPP database in accordance with the size of the HPC cluster, it is possible to reduce the total migration time by orders of magnitude.

In one aspect, a method includes continuously combining seismic migration results using a massively parallel processing (MPP) database. In another aspect, an apparatus includes electronic hardware circuitry configured to continuously combine seismic migration results using a massively parallel processing (MPP) database. In a further aspect, an article includes a non-transitory computer-readable medium that stores computer-executable instructions. The instructions cause a machine to continuously combine seismic migration results using a massively parallel processing (MPP) database.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
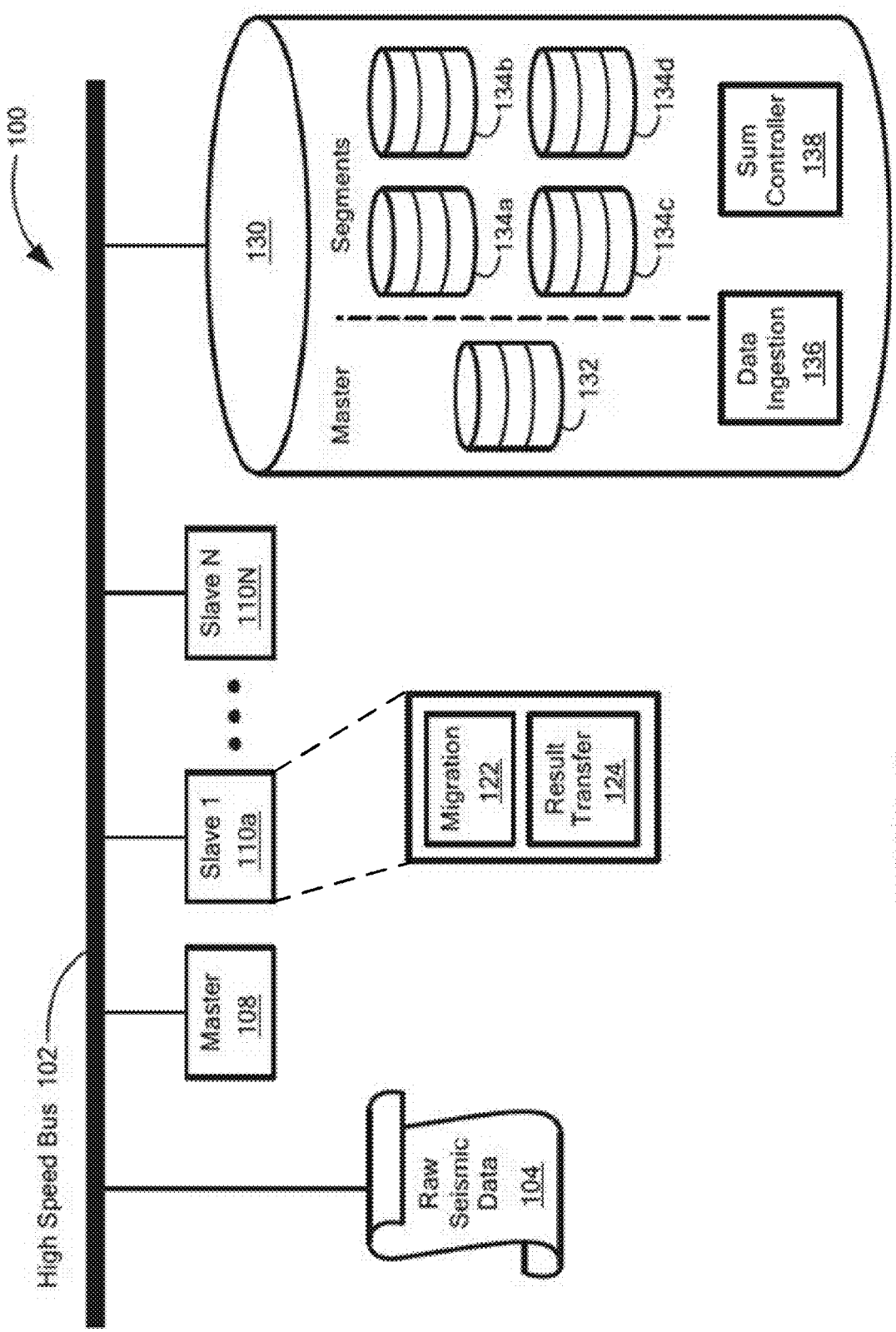
FIG. 1 is a block diagram of an example of a system to continuously combine seismic migration results using a massively parallel processing (MPP) database.

Seismic migration is an essential part of the workflow for oil & gas exploration. It is the main process for generating images that represent the Earth's subsurface.

Based on reflected seismic waves, generated by a source and registered by different receivers (sensors), and on velocity models for the wave propagation, seismic migration algorithms try to identify the points where the waves were reflected and thus build a seismic image. The original seismic waves, usually called shots, are generated by a source and their reflections are collected by the sensors. The signals collected by each receiver for a shot are called seismic traces. Seismic traces are grouped according to different criteria, such as common-shot, common-receiver and common-mid-point.

Seismic migration algorithms process the seismic gathers to map the subsurface. RTM (reverse time migration) works with common-shot gathers of traces. RTM is very useful to map areas that have a complex geology, but it is a time-consuming process that usually demands a High Performance Computing (HPC) environment to be executed.

Hundreds of thousands of shots are usually processed and their results may have to be combined (stacked) in order to generate a single image. The result from processing a seismic shot is either a 2D or a 3D matrix (depending on whether a 2D or a 3D migration is being executed) of floating point numbers, representing levels of energy at points of the subsurface. In the case of 3D migration, these matrices are called seismic cubes and might have many Gigabytes. Depending on the size of the area being mapped, the seismic cubes might correspond to the whole area or just to the part of which the seismic shot is relevant to. Anyway, the final image is the combination of the results from processing all shots, accumulating the values that correspond to the same cells of the complete seismic cube.

As an HPC application might take many weeks to execute, it is necessary to have some kind of checkpoint strategy to save the status of the computation so that it can be resumed in case of failure, without having to repeat the whole process all over again. Conventional checkpointing is very often a bottleneck for HPC applications. It usually stops the process in all nodes and saves the current memory state of each node into disk.

The processing of different shots by RTM is independent from one another. If it is possible to process each shot within a single node of the HPC cluster, a shared-nothing strategy is adopted that can dramatically speed up the process. As described herein, a method may be used to keep a continuous process in which shots are processed, without any interruption for checkpoints, and, in parallel, results are transferred to a massively parallel processing (MPP) database that efficiently combines (stacks) the results.

Data is transferred from the compute nodes to the MPP database using a method that allows the parallel data ingestion by different nodes. The ingested data is distributed among the database segments according to their position in the complete seismic cube, so that contributions to the same value of a cell are always stored in the same segment. When the number of results from processed shots reaches a specific limit, the sum of the results stored so far is triggered, consolidating them.

The techniques described herein enhances the seismic migration in two ways. First, the consolidation of the results within the MPP database does not interfere in the migration process. In this way, the overall time to process all shots tends to get close to (Num_shots*Time_1_shot_migration)/Num_nodes, where Time_1_shot_migration stands for the time to generate results for one shot, Num_shots stands for the total number of shots to be processed and Num_nodes stands for the total number of nodes of the HPC environment that are available to process shots. Second, recovery time from node failure tends to become minimal. In the case each result is immediately transferred to the database, the only shots that have to be processed again are the one that was being processed at the node that failed and the one processed at that node the results of which were still being transferred.

Experiments have shown that it is viable to keep a continuous flow in which hundreds of nodes process shots in parallel, without any interruption for checkpoints, and results are transferred and accumulated (stacked) in parallel within the database. In this way, the described method can contribute to dramatically speed up seismic migration. The method has also shown to be scalable as the number of segments is increased in the MPP database as the number of compute nodes in the HPC cluster increases.

Reverse time migration (RTM) is a compute intensive application that simulates the seismic wave propagation forward and backward, using the full wave differential equation. For each shot, the direct wave propagation is simulated to register the time necessary for the wave to achieve each part of the seismic cube. A second stage is the backpropagation of the signals recorded by the sensors (the seismic traces) within the seismic cube. For each cell of the seismic cube, the level of energy generated by the back-propagated waves is recorded as the output of the process. In this way, the points where reflections occurred tend to have higher levels of energy, marking than the transition between geological layers. In order to apply a finite difference method, RTM demands a considerable amount of memory to store matrices that represent the energy level at consecutive times. However, by representing the part of the subsurface that is relevant for a single shot within a single HPC compute node, the migration of the shots becomes parallel. In various embodiments, by representing the part of the subsurface that may be relevant for a single shot within a single HPC compute node, the migration of the shots may become embarrassingly parallel.

When there are hundreds of thousands of shots that can be processed in parallel by many nodes, without communication between them, a problem that was initially seen as CPU bound tends to become I/O bound. The new problem is how to efficiently combine the results from the various shots and store them in persistent memory. In addition, if it is possible to transfer the results to persistent storage and stack them, additional checkpointing is no longer necessary to deal with potential failures of compute nodes.

One problem is avoiding interference in the seismic migration process. In order to maximize performance, it is necessary to form mechanisms to execute the combination of results (stacking) without interrupting the continuous processing of seismic shots by the compute nodes.

A second problem is the fast combination of results. In order to obtain the final seismic image with no additional time, the combination of results should be executed in parallel at a rate that is equal or higher than the rate the results are generated by the compute nodes. If no bottleneck exists for combining the results, the overall time can be dramatically reduced.

A third problem is the minimal amount of work to be repeated in case of failure. In HPC applications, checkpointing is usually necessary because repeating a process that might last for weeks just because one of the nodes failed is costly. Checkpointing is however a costly procedure in which all computing stops in order to save the state of the computation in different nodes into disk, so that the work can be resumed from this point on in case of failure. The more often checkpoint occurs, the less is the work that has to be repeated in case of failure. On the other hand, if checkpoints occur more often than necessary, they impact the time of the overall process.

If instead of conventional checkpointing the results of processing each shot is stored, a considerable amount of time may be saved. By saving the results of the processed shot as soon as possible, the number of shots that have to be processed again in case of failure tends to be minimal.

In many embodiments, the current disclosure may enable creation of a method to speed up an RTM (reverse time migration) algorithm by means of transferring the results from the migration of different seismic shots to a Massively Parallel Processing database. In various embodiments, a database may continuously ingest the data into various segments in parallel. In some embodiments, when the volume of transferred data reaches a certain limit, a parallel sum may be executed combining (stacking) the results transferred so far. In certain embodiments, results from processing all shots may be stacked within the database. In most embodiments, as data ingestion and sum can occur in parallel with the seismic migration, the HPC compute nodes may be enabled to process the seismic shots without any interruption.

In many embodiments, the current disclosure may enable implementation of a method to provide a fast recovery procedure for failure of HPC nodes, without resorting to additional checkpointing procedures. In various embodiments, Only the shots from the failed node that have not yet been transferred may have to be processed again. In certain embodiments, this methodology may enable a minimal amount of work to be repeated.

Referring to FIG. 1, a system 100 is used to continuously combine seismic migration results using an MPP database. The system 100 includes a high speed bus 102, raw seismic data 104, a master component 108, slave components 110 (e.g., slave 1 110a to slave N 110N) and an MPP database 130. Each slave component 110 includes a migration process 122 and a result transfer process 124. The MPP database 130 includes a master database 132, segment databases 134a-134d, a data ingestion module 136 and a sum controller module 138.

The migration process 122 runs within each of the slave nodes 110 of the HPC cluster and is controlled by the master component 108. Each shot is entirely processed within a single slave component 110. Raw seismic data 104 from the various shots are read by the slave components (110a-110N) as necessary to process new shots. The result transfer process 124 runs in parallel with the migration process 122 (See, for example, FIG. 2) and is configured to transfer results of the migrated shots to the MPP database 130. Results are continuously ingested into the MPP database 130 by the data ingestion module 136 as they are generated and they are stacked using an MPP database procedure.

Figure 2:
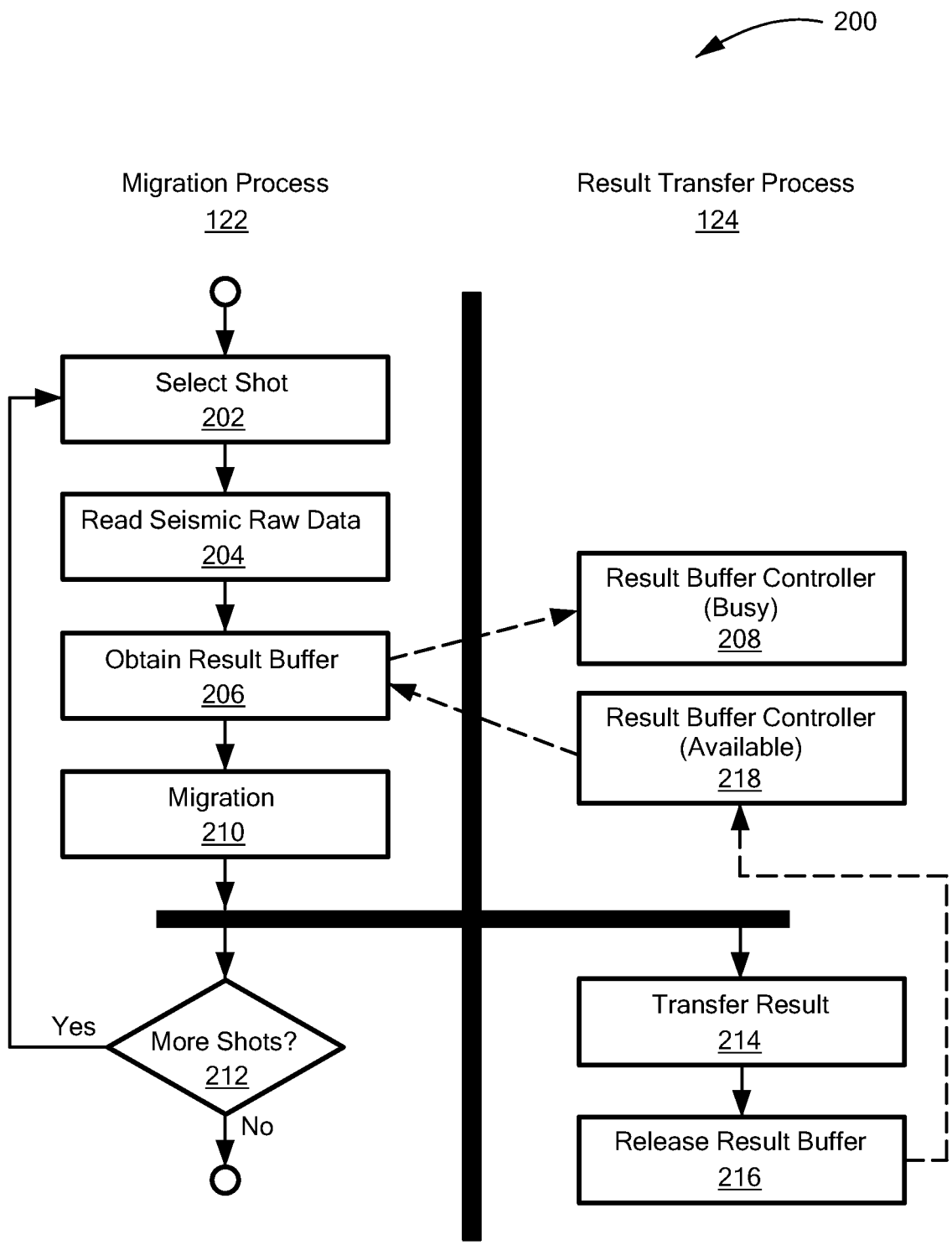
FIG. 2 is a flowchart of an example of a process that includes a migration process and a result transfer process.

Referring to FIG. 2, a process 200 includes the migration process 122 and result transfer process 124. FIG. 2 represents how the migration process 122 and result transfer process 124 interact within each slave 110. The migration process 122 selects a shot to be processed (202) and reads the seismic traces (204) that belong to the gather (i.e., collection of seismic traces which share some common geometric attribute) corresponding to this shot.

Process 200 attempts to obtain access to a result buffer (206). If the result buffer is busy a result buffer controller stalls the process 200 (208) until the result buffer controller indicates that the result buffer is available (218). When there is a buffer available to store the results, the migration (210) starts immediately and the results are saved at the result buffer (206).

Figure 3:
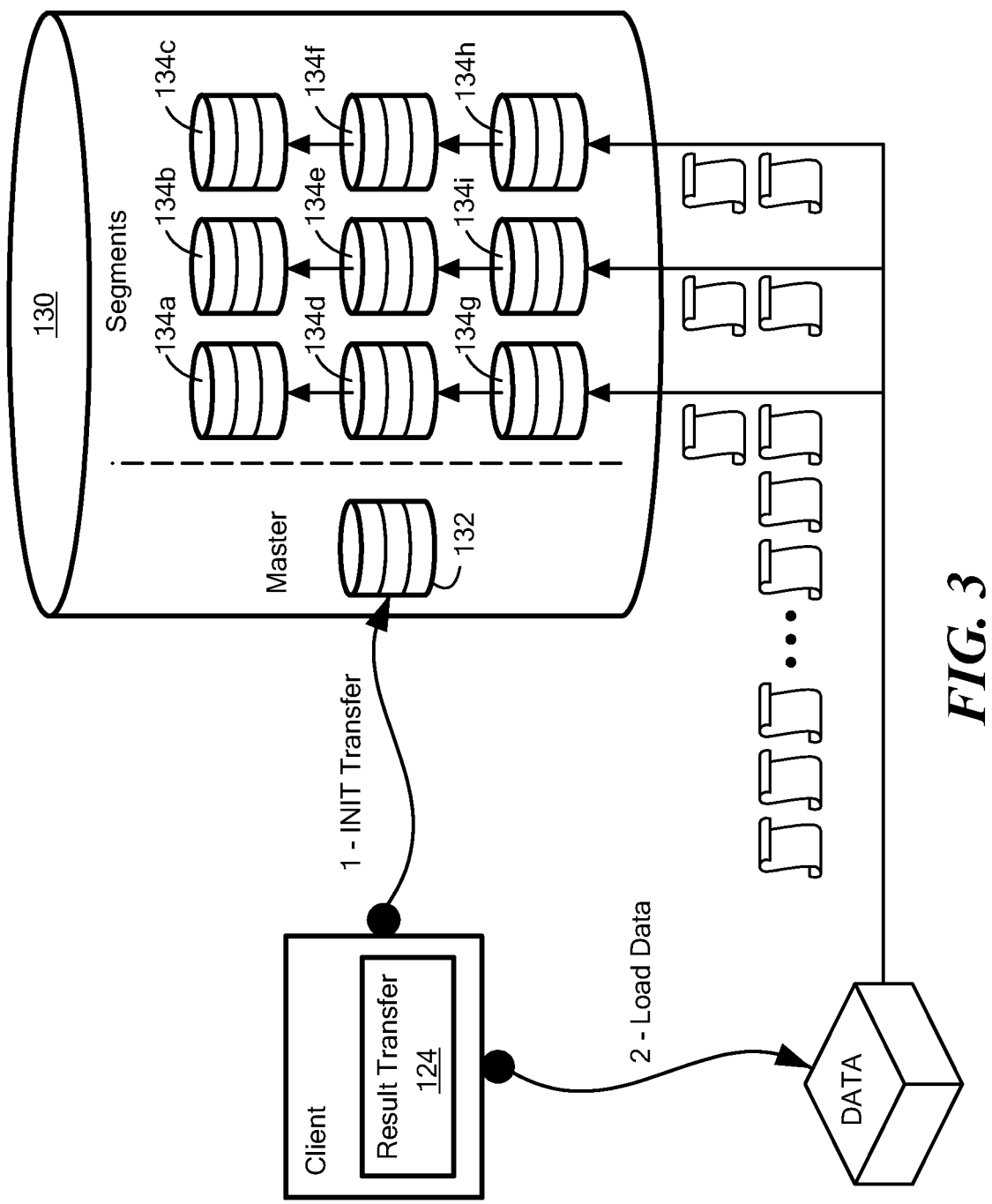
FIG. 3 is a block diagram of an example of ingestion of seismic migration results.

After obtaining the results, the result transfer process 124 transfers them to the MPP database (214), but, in parallel, the seismic migration process 122 continues processing another shot whenever there are shots to be processed (212 and 202). After transferring all the results, the result buffer is released (216) and can be reused for the migration of another shot. The process tries to explore the parallelism between the tasks of reading and processing the traces and the task of transferring results from a previously processed shot. In order to avoid any interruption, two buffers should be used if there is enough memory available. If there is only one result buffer, the seismic migration of the new shot might have to wait for the result buffer to be released. This might happen when the time to read the new raw seismic data gathered is shorter than the time to transfer the previous result. FIG. 3 depicts the ingestion of the seismic migration results for one shot as controlled by the data ingestion module 136. The raw data is transferred to the MPP database 130 by using a procedure in which the data is copied into an internal database table. Initially, the results within a slave component 110 are stored into an external table. Initially, the results within a slave 110 are assigned to an external database table. External tables are virtual database tables that provides access to data stored externally either in files or main memory. The start of the process is the execution of an SQL command that copies all the data from the external table to an internal database table. The SQL command is sent from the result transfer process 124 to the MPP database master node 132. The data ingestion however occurs using a fast procedure that splits the results into blocks and distributes them into different segment nodes (e.g., segment nodes 134a-134i) according to the part of the seismic data cube that they correspond to.

Figure 4:
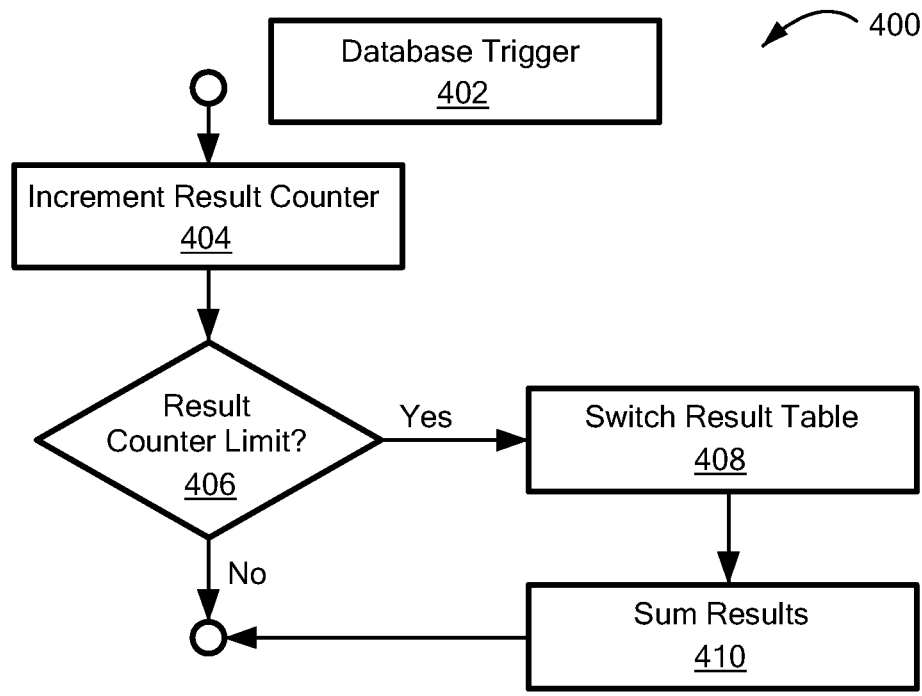
FIG. 4 is a flowchart of an example of a process performed by a sum controller.

FIG. 3, as noted above, depicts the ingestion of the seismic migration results for one shot as controlled by the data ingestion module 136. After the ingestion of the results of each shot, the Sum Controller process 138 is activated. The Sum Controller process 138 is a database trigger that counts the number of results stored in the database since the last time all loaded results were summed, and the partial results deleted. Referring to FIG. 4, a process 400 is a process performed by the sum controller 138. After the ingestion of the results of each shot, the process 400 is activated. A database trigger 402 is used to increment a counter (404) that counts the number of results stored in the database since the last time that previous seismic migration results were summed. When the number of results reaches a previously specified limit, the result table is switched (408) and a SQL command is executed to sum the results stored within the segments (410). As all values to be processed are grouped into the segments according to their position into the seismic cube, there is no need of communication between the segment nodes (e.g., segment nodes 134a-134h) and the sum is a parallel process (e.g., an embarrassingly parallel process) that can be efficiently executed by the MPP database 130. After summing the partial results corresponding to individual seismic shot migrations, the partial results are deleted and just the accumulated values are kept.

In one example, two tables are used to store results: table A and table B. Initially table A is the current table that receives the results. When they have to be stacked, table B becomes the current table to receive new results. Results in table A are all stacked, the accumulated values are saved into table B and table A is dropped. The opposite occurs when table B is the current table and the results have to be stacked. While the sum of results occurs, new results from the HPC cluster can continue to be loaded into the database without any interruption. The right value for the limit that specifies when results should be stacked depends on the available space and the time necessary to sum them. Ideally, the limit should be defined in such a way that both data ingestion and the sum of results have minimal impact on the overall migration time.

In most embodiments, the current disclosure may enable stacking results in parallel with continuous seismic migration. In various embodiments, it may be viable to perform a seismic migration in which thousands of shots may be processed in parallel, without any interruption, and the results may also be stacked in parallel, without creating a bottleneck. In certain embodiments, performance may be improved as much as necessary by adding more compute nodes. In most embodiments, the current disclosure may enable fault tolerance with minimal overhead and fast recovery. In various embodiments, as results may be transferred to the MPP database as soon as they are generated, when there is a failure in one of the compute nodes, the shots that may need to be processed again may be the ones that were being processed at the node and the previous one, the results of which may not have been fully transferred.

In many embodiments, a Greenplum database is usable as an MPP database. In various embodiments, a ¼ rack DCA and servers that generate the data may have been connected to the database through a switch with two 10 gb channels. In certain embodiments, tests may be executed to evaluate both the times to ingest the results into the database and to sum them. In most embodiments, in order to evaluate the time to transfer the results from the compute nodes and ingest them into the database, parallel ingestion of 64 GB, 128 GB, 256 GB, 512 GB, 1 TB and 2 TB may have been tested. In various embodiments, data may have been continuously generated by 4 servers. In certain embodiments, the ingestion time may have included 52s, 102s, 222s, 432s, 885s and 1912s, respectively. In some embodiments, this may mean that that the ingestion rate may always have been above 1 GB/s. In other embodiments, in order to obtain these rates, the results may have been initially saved into local disks and then the Greenplum tool GPFDIST may be used to load the data directly and in parallel into the segment nodes. In many embodiments, if the time to save the data into local disks is considered, the total ingestion rate may have been around 0.5 GB/s. In most embodiments, an ingestion of data directly from memory may have the potential to be close to 1 GB/s or more, depending on the network speed.

In an embodiment, tests were executed in which the time to sum a large number of results using the Greenplum MPP mechanisms, was verified. In in this embodiment, testing included loading 128 GB, 256 GB, 512 GB and 1 TB of data into the database and then executed the sum. In this embodiment, the rate of accumulation of the values within the database was around 2 GB/s. With a database appliance containing more segments, it is possible to increase this performance as necessary. In many embodiments, the migration of one shot using HPC clusters with general-purpose computing on graphics processing units (GPGPUs) may take around 6 min and may be enabled to generate results with 4 GB to be accumulated for each shot (11 MB/s rate). In these embodiments, a ¼ Greenplum DCA may be enabled to support the accumulation of results generated in parallel by around 100 HPC nodes. In various embodiments, using a full DCA may enable consumption of the results generated by up to 400 HPC nodes.

In many embodiments, the overall method described may be enabled to address the needs of summing the results of processing shots in Reverse Time Migration seismic processing and may allow a continuous processing of shots and a minimal repetition of work in case of node failures. In various embodiments, the methods and/or system disclosed may be enabled to be adapted to any HPC application in which the following hypotheses are valid:

i. The input may be split into independent parts and processed in parallel by HPC nodes, producing partial results.

ii. Partial results correspond to large blocks that may need to be combined in order to create the final output.

iii. Values from different partial results may be combined based on spatial references.

iv. The partial results may be combined incrementally.

Figure 5:
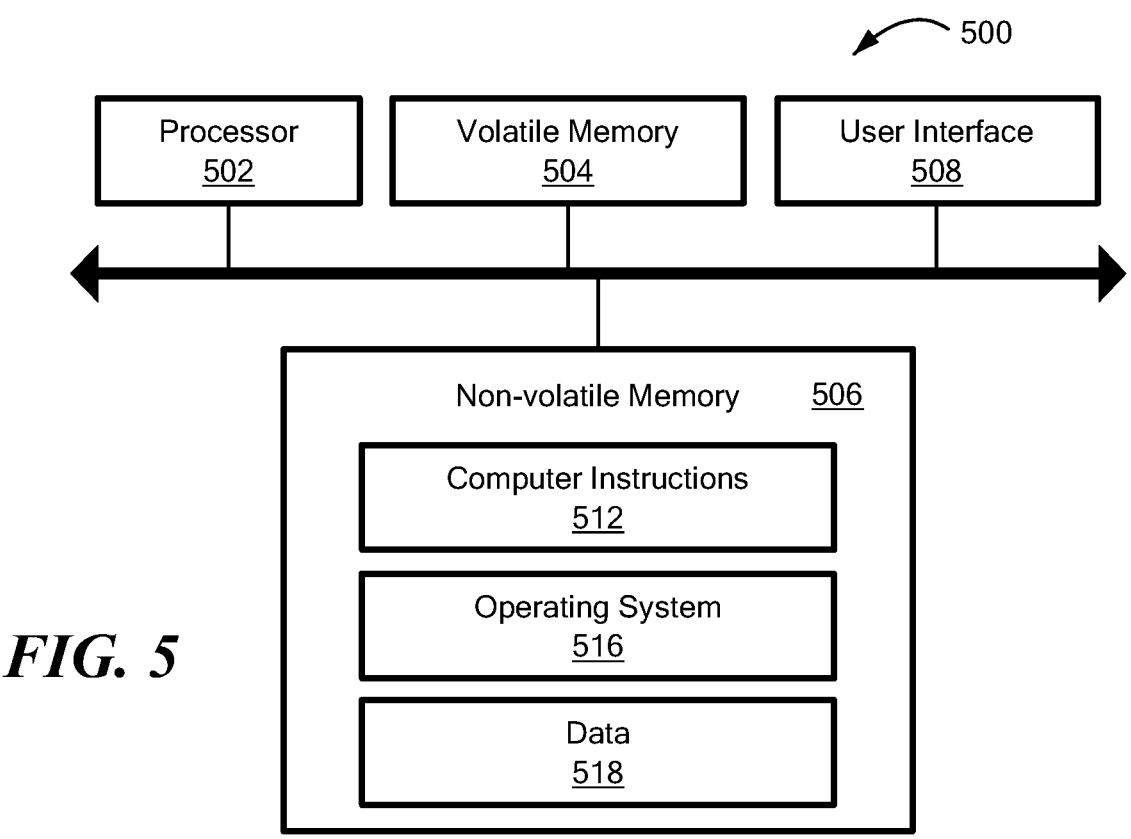
FIG. 5 is a simplified block diagram of an example of a computer on which any of the processes of FIGS. 2 and 4 may be implemented.

Referring to FIG. 5, in one example, a computer 500 includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 200 and 400).

The processes described herein (e.g., processes 200 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 and 400 are not limited to the specific processing order of FIGS. 2 and 4, respectively. Rather, any of the processing blocks of FIGS. 2 and 4, combined or removed, performed in parallel or in serial, as necessary, to achieve the results set forth above.

The processing blocks (for example, in the processes 200 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   (a-1) configuring a first number of compute nodes, each respective compute node comprising a migration process and a result transfer process, wherein each respective compute node is configured for receiving and processing seismic raw data associated with a plurality of shots, wherein each respective compute node is configured to process an entire shot within the respective compute node;
   (a-2) configuring a set of result buffers to provide, for each respective compute node, at least one corresponding result buffer in operable communication with the respective compute node, the corresponding result buffer configured to store a respective set of seismic migration results generated at the respective compute node;
   (a-3) configuring a massively parallel processing (MPP) database to be in operable communication with the first number of compute nodes and with the set of result buffers, wherein the MPP database comprises:
      a second first number of segment database nodes available to store seismic migration results;
      a data ingestion module configured to receive seismic migration results from the respective result buffers and to control ingestion of seismic migration results into the segment database nodes; and
      a sum controller configured to sum the results stored in the second number of segment database nodes;
   (b-1) receiving, into the first number of compute nodes, the seismic raw data associated with a plurality of shots;
   (b-2) processing, in each respective compute node, the seismic raw data into a respective set of seismic migration results;
   (c) configuring the migration process in each respective compute node to migrate a respective subset of the seismic raw data associated with a respective first or next one of the plurality of shots from the respective compute node to the corresponding at least one result buffer for the respective compute node;
   (d-1) in parallel with the migration process, configuring the result transfer process in each respective compute node to transfer and store the respective set of seismic migration results from the corresponding at least one result buffer to the data ingestion module of the segment database nodes of the MPP database;
   (d-2) in parallel with the migration process, configuring the data ingestion module to ingest the transferred seismic migration results, in parallel, into the corresponding one or more segment database nodes of the MPP, wherein the transferred seismic migration results are ingested and grouped into the one or more corresponding segment database nodes according to the position of the seismic migration results in a seismic cube that is associated with the seismic migration results;
   (e) in parallel with the migration process, selecting a next respective one of the plurality of shots to be processed at a respective one of the first number of compute nodes;
   (f) repeating (c) through (e) continuously until a number of seismic migration results in the MPP database reaches a predefined limit, the predefined limit based at least in part on the first number of compute nodes and the second number of segment database nodes, wherein the predetermined limit is selected to ensure that a time for data ingestion into the MPP database and for combining in the MPP database does not substantially increase an overall time for migration; and
   (g) in parallel with the migration process, when the predefined limit is reached, configuring the sum controller to execute a parallel sum that combines, within the MPP database, the seismic migration results that were transferred and stored in (d-1) up to the time the predefined limit is reached, into a plurality of accumulated values;
      wherein (a-1) through (g) are configured and wherein the predefined limit is selected, so that a time to complete (g) is less than a time to complete (b-1) through (e), such that (b-1)-(e) occur substantially in parallel with (g) without interruption for checkpointing;
   and
      wherein (a-1) through (g) are configured to continuously ingest, combine, and stack the seismic migration results, within the MPP database, using the data ingestion module, sum controller and segment database nodes of the MPP database.

2. The method of claim 1, wherein (e) further comprises releasing the at least one corresponding result buffer after transferring the respective set of seismic migration results to the data ingestion module of the MPP data base.

3. The method of claim 1, wherein (g) further comprises:
   (g-1) measuring a third number of results stored in the MPP database since the sum controller previously summed seismic migration results into the plurality of accumulated values, using a counter; and (g-2) summing the third number of results stored within the segment database nodes, into the plurality of accumulated values, if the counter reaches the predefined limit.

4. The method of claim 1, wherein the value of the predefined limit is defined such that the time to continuously combine previously stored seismic migration results into the plurality of accumulated values being less than the time to receive a number of results corresponding to the predefined limit, is configured to enable stacking seismic migration results within the MPP database from each of the first number of compute nodes, wherein the stacking of migration results is configured such that if there is a failure of a respective one of the first number of compute nodes, only shots from the failed respective compute node need to be processed again.

5. The method of claim 1, wherein (d-2) further comprises:
- (d-2-a) distributing the ingested seismic migration results among the corresponding one or more segment database nodes of the MPP database according to the respective positions of the seismic migration results in a seismic cube, the seismic cube comprising a 3-dimensional matrix of cells; and
- (d-2-b) storing the distributed seismic migration results in the corresponding segment database nodes so that contributions to the same value of a cell of the seismic cube are stored in the same corresponding segment database node, wherein the storing of distributed seismic migration results into the corresponding segment database nodes is configured to allow, at (g), the parallel computation of a parallel sum for all cells without data transfer between the segment database nodes.

6. An apparatus, comprising electronic hardware circuitry configured to:
- (a-1) provide a first number of compute nodes, each respective compute node comprising a migration process and a result transfer process, wherein each respective compute node is configured for receiving and processing seismic raw data associated with a plurality of shots, wherein each respective compute node is configured to process an entire shot within the respective compute node;
- (a-2) provide, for each respective compute node, at least one corresponding result buffer in operable communication with the respective compute node, the result buffer configured to store a respective set of seismic migration results generated at the respective compute node;
- (a-3) provide a massively parallel processing (MPP) database to be in operable communication with the first number of compute nodes and with the set of result buffer, wherein the MPP database comprises:
  - a second number of segment database nodes available to store seismic migration results;
  - a data ingestion module configured to receive seismic migration results from the respective result buffers and to control ingestion of seismic migration results into the segment database nodes; and
  - a sum controller configured to sum the results stored in the second number of segment database nodes;
- (b-1) receive, into the first number of compute nodes, the seismic raw data associated with a plurality of shots;
- (b-2) process, in each respective compute node, the seismic raw data into a respective set of seismic migration results;
- (c) cause the migration process in each respective compute node to migrate a respective subset of the seismic raw data associated with a respective first or next one of the plurality of shots from the respective compute node to the corresponding at least one to a result buffer for the respective compute node;
- (d-1) in parallel with the migration process, cause the result transfer process in each respective compute node to transfer and store the respective set of seismic migration results from the corresponding at least one result buffer to the data ingestion module of the segment database nodes of the MPP database;
- (d-2) in parallel with the migration process, cause the data ingestion module to ingest the transferred seismic migration results, in parallel, into the corresponding one or more segment database nodes of the MPP, wherein the transferred seismic migration results are ingested and grouped into the one or more corresponding segment database nodes according to the position of the seismic migration results in a seismic cube that is associated with the seismic migration results;
- (e) in parallel with the migration process, select, a next respective one of the plurality of shots to be processed at a respective one of the first number of compute nodes;
- (f) repeat (c) through (e) continuously until a number of seismic migration results in the MPP database reaches a predefined limit, the predefined limit based at least in part on the first number of compute nodes and the second number of segment database nodes, wherein the predetermined limit is selected to ensure that a time for data ingestion into the MPP database and for combining in the MPP database does not substantially increase an overall time for migration; and
- (g) in parallel with the migration process, when the predefined limit is reached, configuring the sum controller to execute a parallel sum that combines, in the MPP database, the seismic migration results that were transferred and stored in (d-1) up to the time the predefined limit is reached, into a plurality of accumulated values;
  - wherein (a-1) through (g) are configured and wherein the predefined limit is selected, so that a time to complete (g) is less than a time to complete (b-1) through (e), such that (b-1)-(e) occur substantially in parallel with (g) without interruption for checkpointing; and
  - wherein (a-1) through (g) are configured to continuously ingest, combine, and stack the seismic migration results, within the MPP database, using the data ingestion module, sum controller and segment database nodes of the MPP database.

7. The apparatus of claim 6, wherein the circuitry comprises at least one of a processor, a memory, a programmable logic device or a logic gate.

8. The apparatus of claim 6, wherein the circuitry configured to continuously combine seismic migration results using the MPP database further comprises circuitry configured to release the at least one corresponding result buffer after transferring the respective set of seismic migration results to the data ingestion module of the MPP database.

9. The apparatus of claim 6, wherein the apparatus further comprises circuitry configured to:
- (g-1) measure a third number of results stored in the MPP database since the sum controller previously summed seismic migration results into the plurality of accumulated values, using a counter; and (g-2) sum the third number of results stored within the segment database nodes into the plurality of accumulated values, if the counter reaches the predefined limit, wherein the value of the predefined limit is defined such that the time to continuously combine previously stored seismic migration results into the plurality of accumulated values being less than the time to receive a number of results corresponding to the predefined limit, is configured to enable stacking seismic migration results within the MPP database from each of the plurality of compute nodes, wherein the stacking of migration results is configured such that if there is a failure of a respective one of the plurality of compute nodes, only shots from the failed respective compute node need to be processed again.

10. The apparatus of claim 6, wherein the circuitry configured to perform (d) further comprises:
(d-2-a) circuitry configured to distribute the ingested seismic migration results among the corresponding one or more segment database nodes of the MPP database according to the respective positions of the seismic migration results in a seismic cube, the seismic cube comprising a 3-dimensional matrix of cell; and
(d-2-b) circuitry configured to store the distributed seismic migration results in the corresponding segment database nodes so that contributions to the same value of a cell of the seismic cube are stored in the same corresponding segment database node, wherein the storing of distributed seismic migration results into the corresponding segment database nodes is configured to allow, at (g), the parallel computation of a parallel sum for all cells without data transfer between the segment database nodes.

11. An article comprising:
a non-transitory computer-readable medium that stores computer-executable instructions, the instructions causing a machine to:
(a-1) configure a first number of compute nodes, each respective compute node comprising a migration process and a result transfer process, wherein each respective compute node is configured for receiving and processing seismic raw data associated with a plurality of shots, wherein each respective compute node is configured to process an entire shot within the respective compute node;
(a-2) configure a set of result buffers to provide, for each respective compute node, at least one corresponding result buffer in operable communication with the respective compute node, the corresponding result buffer configured to store a respective set of seismic migration results generated at the respective compute node;
(a-3) configure a a massively parallel processing (MPP) database to be in operable communication with the first number of compute nodes and with the set of result buffers, wherein the MPP database comprises:
a second number of segment database nodes available to store seismic migration results;
a data ingestion module configured to receive seismic migration results from the respective result buffers and to control ingestion of seismic migration results into the segment database nodes; and
a sum controller configured to sum the results stored in the second number of segment database nodes;
(b-1) receive, into the first number of compute nodes, the seismic raw data associated with a plurality of shots;

(b-2) processing, in each respective compute node, the seismic raw data into a respective set of seismic migration results;
(c) configure the migration process in each respective compute node to migrate a respective subset of the seismic raw data associated with a respective first or next one of the plurality of shots from the respective compute node to the corresponding at least one a result buffer for the respective compute node;
(d-1) in parallel with the migration process, configure the result transfer process in each respective compute node to transfer and store the respective set of seismic migration results from the corresponding at least one result buffer to the data ingestion module of the segment database nodes of the MPP database;
(d-2) in parallel with the migration process, configure the data ingestion module to ingest the transferred seismic migration results, in parallel, into the corresponding one or more segment database nodes of the MPP, wherein the transferred seismic migration results are ingested and grouped into the one or more corresponding segment database nodes according to the position of the seismic migration results in a seismic cube that is associated with the seismic migration results;
(e) in parallel with the migration process, select a next respective one of the plurality of shots to be processed at a respective one of the first number of compute nodes;
repeat (c) through (e) continuously until a number of seismic migration results in the MPP database reaches a predefined limit, the predefined limit based at least in part on the first number of compute nodes and the second number of segment database nodes, wherein the predetermined limit is selected to ensure that a time for data ingestion into the MPP database and for combining in the MPP database does not substantially increase an overall time for migration; and
(g) in parallel with the migration process, when the predefined limit is reached, configure the sum controller to execute a parallel sum that combines, within the MPP database, the seismic migration results that were transferred and stored in (d-1) up to the time the predefined limit is reached, into a plurality of accumulated values;
wherein (a-1) through (g) are configured and wherein the predefined limit is selected, so that a time to complete (g) is less than a time to complete (b-1) through (e), such that (b-1)-(e) occur substantially in parallel with (g) without interruption for checkpointing; and
wherein (a-1) through (g) are configured to continuously ingest, combine and stack the seismic migration results, within the MPP database, using the sum data ingestion module, controller and segment database nodes of the MPP database.

12. The article of claim 11, wherein the instructions causing the machine to continuously combine seismic migration results using the MPP database further comprises instructions causing the machine to release the at least one corresponding result buffer after transferring the respective set of seismic migration results to the data ingestion module of the MPP database.

13. The article of claim 11, wherein the apparatus further comprises instructions causing the machine to:
(g-1) measure a third number of results stored in the MPP database since the sum controller previously summed seismic migration results into the plurality of accumulated values, using a counter; and
(g-2) sum the third number of results stored within the segment database nodes into the plurality of accumulated values, if the counter reaches the predefined limit, wherein the value of the predefined limit is defined such that the time to continuously combine previously seismic migration results into the plurality of accumulated values being less than the time to receive a number of results corresponding to the predefined limit is configured to enable stacking seismic migration results within the MPP database, from each of the first number of compute nodes, wherein the stacking of migration results is configured such that if there is a failure of a respective one of the first number of compute nodes, only shots from the failed respective compute node needs to be processed again.

14. The article of claim 11, wherein the instructions causing the machine to perform (d-2) further comprises instructions causing the machine to:
   (d-2-a) distribute the ingested seismic migration results among the corresponding one or more segment database nodes of the MPP database according to the respective positions of the seismic migration results in a seismic cube, the seismic cube comprising a 3-dimensional matrix of cells; and
   (d-2-b) store the distributed seismic migration results in the corresponding segment database nodes so that contributions to the same value of a cell of the seismic cube are stored in the same corresponding segment database node, wherein the storing of distributed seismic migration results into the corresponding segment database nodes is configured to allow, at (g), the parallel computation of a parallel sum for all cells without data transfer between the segment database nodes.

15. The method of claim 1, wherein (g) further comprises summing the seismic migration results so as to substantially consolidate the seismic migration results.

16. The method of claim 1, further comprising:
   (h) retaining in the MPP database the plurality of accumulated values; and
   (i) deleting the seismic migration results from the MPP database.

17. The apparatus of claim 6, wherein (g) further comprises summing the seismic migration results as to substantially consolidate the seismic migration results.

18. The apparatus of claim 6, further comprising:
   (h) retaining in the MPP database the plurality of accumulated values; and
   (i) deleting the seismic migration results from the MPP database.

19. The article of claim 11, wherein (g) further comprises summing the seismic migration results within the so as to substantially consolidate the seismic migration results.

20. The article of claim 13, further comprising:
   (h) retaining in the MPP database the plurality of accumulated values; and
   (i) deleting the seismic migration results from the MPP database.

* * * * *